Sept. 10, 1974  B. L. DOLL  3,834,969
APPARATUS FOR FORMING A STRETCHABLE TUBULAR PACKAGING MATERIAL
Filed Feb. 3, 1972  3 Sheets-Sheet 3

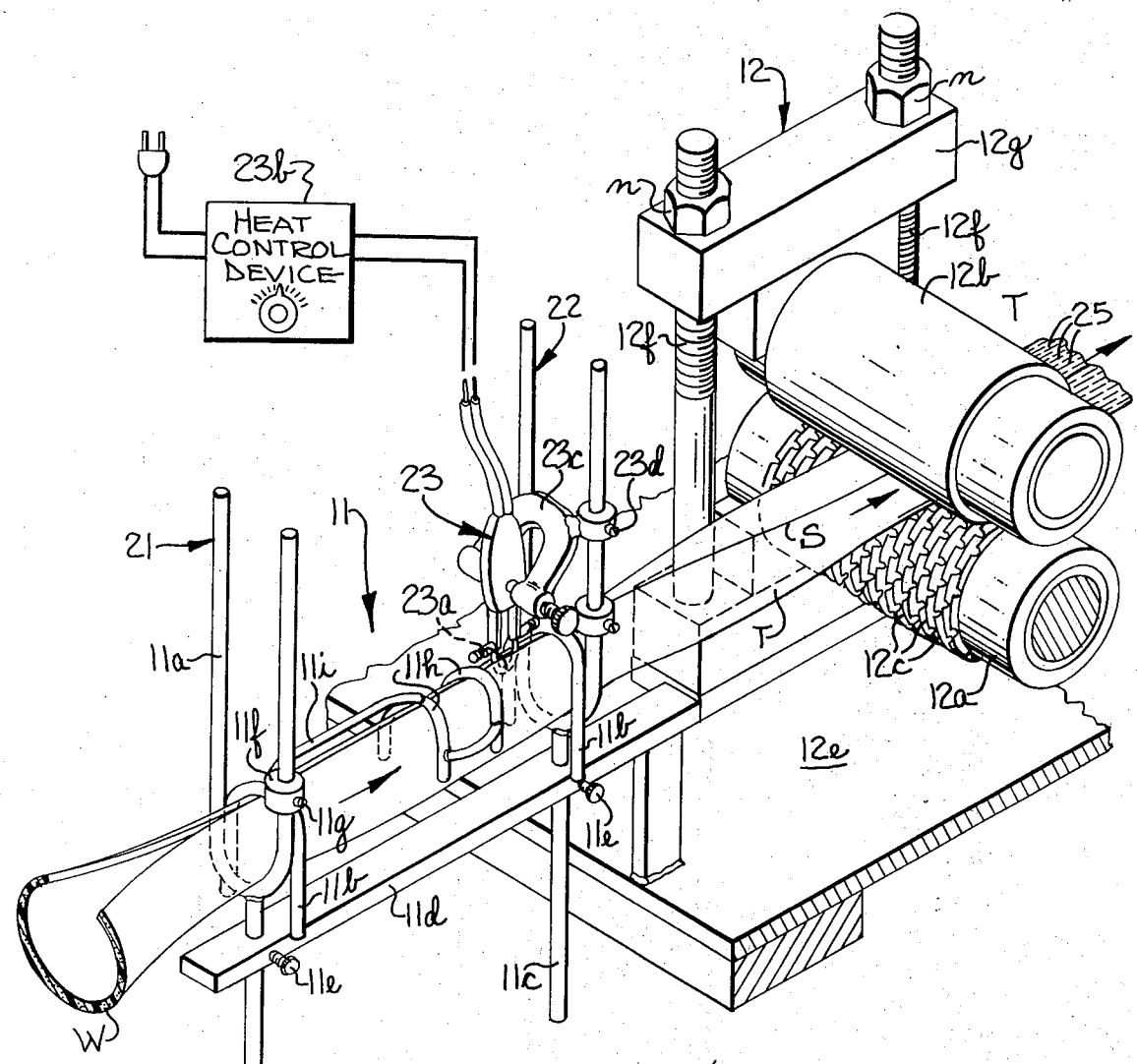
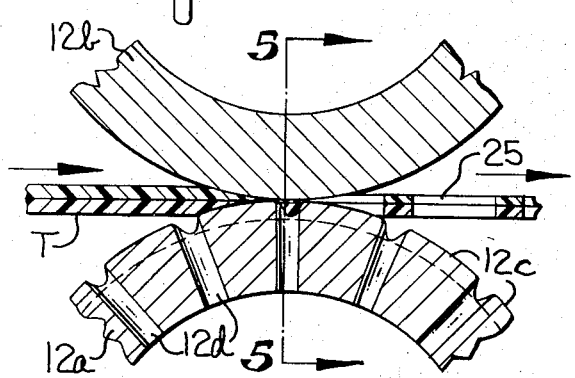
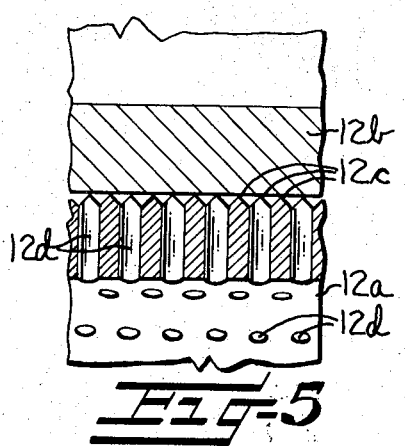

United States Patent Office 3,834,969
Patented Sept. 10, 1974

3,834,969
APPARATUS FOR FORMING A STRETCHABLE TUBULAR PACKAGING MATERIAL
Brendan L. Doll, Patterson, N.C., assignor to Cellu Products Company
Filed Feb. 3, 1972, Ser. No. 223,246
Int. Cl. B23d 25/02; B29d 23/00; B32b 31/00
U.S. Cl. 156—466                                 7 Claims

ABSTRACT OF THE DISCLOSURE

Apparatus for producing resilient, readily stretchable tubes for receiving and packaging articles therein, including means for curving or bowing a sheet or web of flexible foam material to bring opposing side edges thereof into substantially collinear relationship. Means is provided for uniting the thus positioned side edges to form a tube from the web, and slitting means is provided for slitting the foam material in a pattern of spaced apart rows of spaced incisions so arranged that the tube may be stretched radially to receive therein an article of greater cross-sectional area than the initial internal cross-sectional area of the tube, and the tube then will recover into substantial conformance to the size and shape of the article therein.

---

This invention relates to apparatus for producing resilient, stretchable tubular structures particularly useful for protectively packaging fragile articles.

Various apparatuses have been proposed heretofore for producing foraminate and net-like materials. However, the tubular material which is produced by the instant apparatus is novel and applicant knows of no apparatus capable of producing this novel material.

Therefore, it is the primary object of this invention to provide apparatus capable of producing a tubular packaging material which is highly resilient, flexible, shock-absorbent and radially stretchable so that desired lengths thereof may be stretched radially for receiving therein articles of substantially greater cross-sectional area than the initial cross-sectional area of the tubular material and the tubular material then will recover into substantial conformance to the size and shape of the article or articles contained therewithin, and wherein the tubular material may be produced economically and therefore may be discarded after only a single use of the same, if desirable.

It is a more specific object of the invention to provide an apparatus for producing resilient, readily stretchable tubes for receiving and packaging articles therein, which includes means for curving a sheet or web of foam material to bring opposing side edges thereof into substantially parallel, closely proximal or collinear relationship, means for uniting the opposing side edges of the web to form the web into a tube, and means for slitting the flexible foam material in a pattern of spaced apart rows of spaced incisions with the rows extending substantially parallel to the aforementioned side edges and with the incisions in adjacent rows disposed in staggered relationship so that the tube may be stretched radially to receive therein an article of greater cross-sectional area than the initial internal cross-sectional area of the tube and the tube then will recover in substantial conformance to the size and shape of the article.

According to the preferred and disclosed embodiment of the apparatus of this invention, a substantially flat sheet or web of flexible foam material, preferably thermoplastic foam material, is drawn from a suitable source through a first and then a second forming unit in a continuous operation. The first forming unit curves the web transversely thereof to bring opposing longitudinal side edges of the web into substantially collinear relationship. In its course between the forming units, the opposing side edges of the web engage a heating means therebetween, and the second forming unit then forces the opposing side edges of the advancing web into abutting relationship so that they are fused together and firmly united to form a seam to complete formation of a tube from the web. Thereafter, the tube passes through a slitting means in the form of a pair of driven cooperating rolls which flatten opposite halves of the tube therebetween. One of the latter rolls is provided with a plurality of axially spaced and annularly spaced slitting blades thereon which penetrate the flattened tube passing between the rolls to slit the same in a pattern of spaced apart rows of spaced incisions with the rows extending substantially parallel to the previously formed seam in the tube and with the incisions in adjacent rows disposed in staggered relationship. Means is provided for separating the opposing halves of the thus incised tube to break any mating relationship between the material in one of the halves and the incisions in the other of the halves resulting from slitting both halves simultaneously, whereupon the tube is flattened again; and means also is provided for taking up the flattened tube in the form of a spiral or convolute wound roll ready for subsequent use in the packaging of articles in lengths of the tube cut from the roll thus formed.

Some of the objects of the invention having been stated, other objects will appear as the description proceeds, when taken in connection with the accompanying drawings, in which—

FIG. 3 is an enlarged fragmentary perspective view of the tube forming means and slitting means of the apparatus;

FIG. 4 is an enlarged fragmentary view of proximal portions of the slitting roll and an adjacent anvil roll shown in the right-hand portion of FIG. 3 and taken transversely of the axes of the respective rolls;

FIG. 5 is a fragmentary vertical sectional view taken substantially along line 5—5 in FIG. 4;

Figures 6, 7:
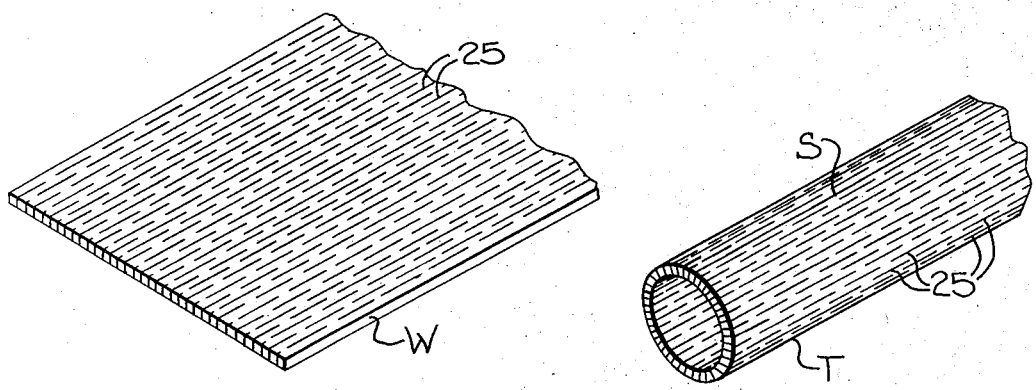
FIG. 6 is a view of a short length of the web of flexible foam material showing the same in slitted condition, as would be the case in the event of the slitting means being positioned upstream of the tube forming means in FIGS. 1, 2 and 3.
Figure 8:
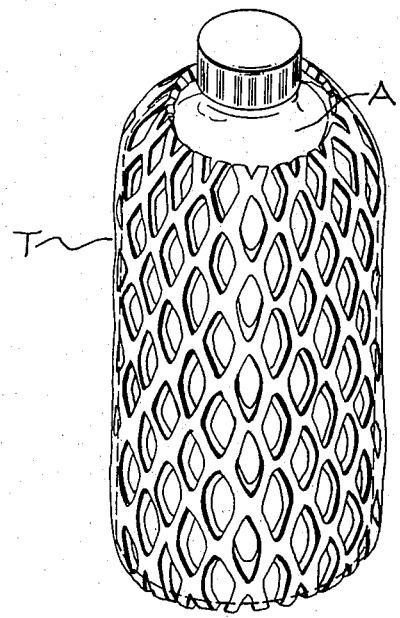

FIG. 7 is a perspective view of a portion of the completely formed stretchable tube in relaxed condition as it might appear before inserting an article therewithin; and FIG. 8 is a perspective view of a length of the tubular material showing the same in a stretched condition firmly encircling an article therein and particularly illustrating how the previously formed incisions in the wall of the tube take on a lozenge-like configuration when the tubular material is stretched radially.

Figure 1:
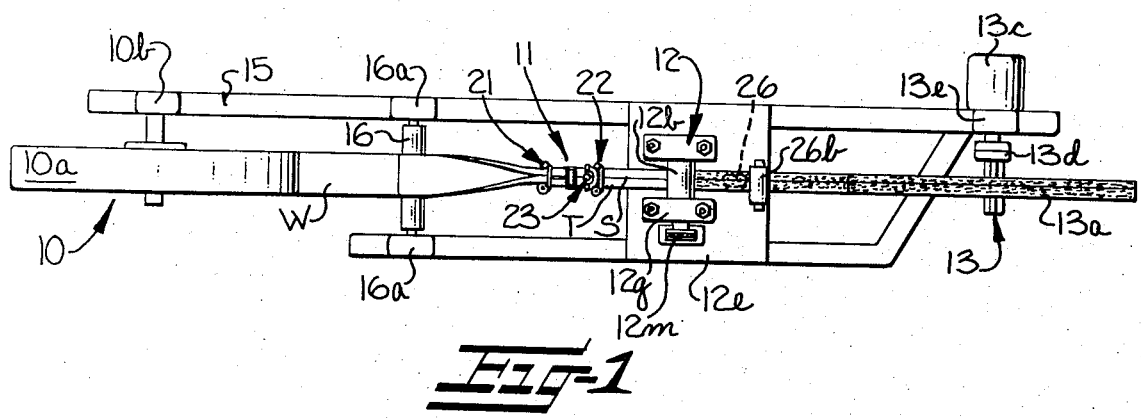
FIG. 1 is a top plan view of a preferred embodiment of the novel apparatus of this invention.
Figure 2:
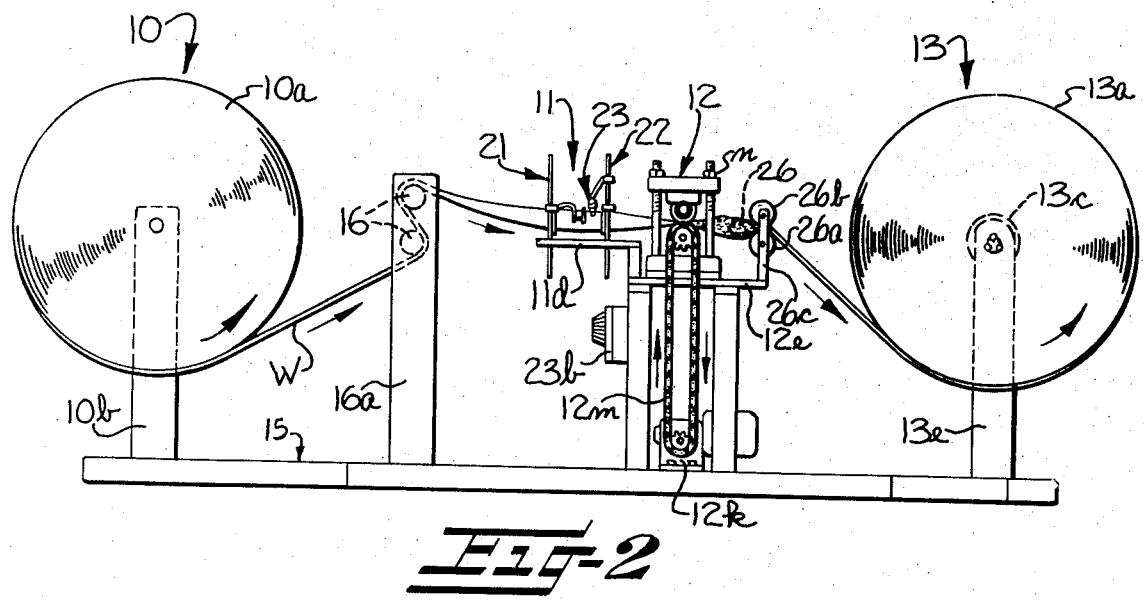
FIG. 2 is a right-hand side elevation of the apparatus.

Referring more specifically to the drawings, in its preferred embodiment, the apparatus of this invention comprises a web or sheet supply source 10 (FIGS. 1 and 2), a tube forming means 11, a slitting means 12, and a tube take-up means 13 arranged in series. Slitting means 12 may be positioned upstream of tube forming means 11, if desired, as will be later explained. As shown, the web supply source is in the form of a letoff or supply roll 10a mounted on a rear standard 10b of a frame 15 of the apparatus. The web W is directed or drawn forwardly from supply roll 10a between and over a pair of transverse guide members 16, and thence to tube forming means 11.

The web W is in the form of a resilient flexible or pliable foam material of such thickness as to provide desired protection for particular articles to be packaged therein against damage and handling. For example, the web may be in the range of about 1/16 to 1/2 inch in thickness, depending upon the size and weight of the articles to be received in the tube to be formed from the web. It is preferred that the web W is about 1/8 to 1/4 inch thick and formed of thermoplastic polyethylene foam material, although other suitable foam materials, such as polypropylene foam, flexible foam polystyrene or natural or synthetic foam rubber may be used.

Primarily, thermoplastic polyethylene foam material is preferred because it is less expensive than other known foam materials suitable for packaging articles therein and it is more readily machine processed than other resilient flexible foam materials. For example, polyethylene foam sheets are readily susceptible to heat-sealing of the side edges thereof together, whereas adhesives are generally required for bonding efficiently the side edges of flexible foam polystyrene, polypropylene foam, or natural or synthetic foam rubber webs together or in overlapping relation. It is apparent that the use of adhesives for forming a seam incident to formation of a tube from a flexible foam web increases the cost of manufacturing such a tube.

Referring again to FIGS. 1 and 2, guide members 16 may be in the form of rollers journaled in a pair of laterally spaced standards 16a mounted on frame 15, with the upper roller 16 being so positioned as to guide web W into forming means 11. As best shown in FIG. 3, forming means 11 generally comprises first and second or rear and front forming units or dies broadly designated at 21, 22, which are constructed so as to surround web W being advanced therethrough and to curve the web transversely thereof so that opposing longitudinal side edges of the web W are brought into substantially collinear relationship and to facilitate uniting such side edges together to complete the formation of a tube T from the web W.

In order that the apparatus may accommodate different webs W of different widths to produce respective different tubes of different diameters or internal cross-sectional areas therefrom, it is preferred that the forming units are adjustable so as to vary the effective size of the tube foming passageways therethrough. Accordingly, each of the foming units 21, 22 comprises a substantially U-shaped main forming body 11a and a cooperating inverted substantially U-shaped auxiliary forming body 11b. Bodies 11a, 11b are relatively radially or vertically adjustable to vary the distance between the crossing portions or brights thereof so as to vary the effective cross-sectional area of the openings defined thereby without necessarily bending the legs of the bodies further apart or closer together. The main and auxiliary forming bodies 11a, 11b may be formed from suitably shaped round rods, as shown, so as to provide rounded edges for the die openings defined by bodies 11a, 11b.

A bar or post 11c extends downwardly from a medial portion of each U-shaped main body 11a and loosely penetrates a substantially horizontally disposed stationary frame member 11d, common to both of the forming units 21, 22, and in which the posts 11c may be secured in the desired vertically adjusted position by suitable set screws 11e. Each auxiliary body 11b has a collar or block 11f thereon loosely penetrated by one of the legs of the respective main body 11a and secured in the desired adjusted position relative to the respective main body 11a by a set screw 11g.

To aid in maintaining the tubular configuration of curved web W and thereby to maintain opposing side edges of web W in close proximity to each other in the course of movement thereof between the longitudinally spaced forming units 21, 22, suitable inverted substantially U-shaped saddle members 11h are space between forming units 21, 22. Saddle members 11h may be about the same shape and size as the upper portions of auxiliary forming bodies 11b and aligned substantially therewith so as to engage the upper portion of the curved web W passing between forming units 21, 22. Saddle members 11h may be suitably interconnected, and the rearmost saddle member 11h has a bar 11i extending rearwardly therefrom which is suitably secured, as by welding, to the upper portion of auxiliary body 11b of first forming unit 21 so as to support saddle members 11h in the desired position.

Spaced between the front saddle member 11h and second forming unit 22 is a web edge uniting means 23 which may take various forms, depending upon the type of foam material of which web W is formed, to unite opposing longitudinal side edges of web W by forming a seam S therealong incident to forming the tubular packaging material or tube T. When processing polypropylene foam, flexible foam polystyrene, natural foam rubber, or synthetic foam rubber, the uniting means should be capable of depositing drops or a bead line of adhesive, preferably a melted thermoplastic resin, on the tube T being formed and along the juncture of opposing edges of the web. Since it is preferred that the tube is formed of polyethylene foam; i.e., a thermoplastic material, in its preferred embodiment the web edge uniting means 23 is in the form of a heating means arranged so as to heat and melt the opposing side edges of the curved web to a viscous or sticky condition to that they will be quickly and effectively bonded together in forming the seam S.

As shown, heating means 23 is electrically operable and has a narrow heating element 23a projecting downwardly therefrom into the path of travel of the curved web W so as to extend between and be engaged by the proximal or collinear opposing edges of web W. The heating element 23a should be of a type which will heat the collinear edges of the web W sufficiently to render them viscous or sticky so that they will be fused together to form a seam thereat as the now tubularly formed web W subsequently passes through the opening defined by the main and auxiliary forming bodies 11a, 11b of second forming unit 22 to complete the formation of tube T. The temperature of heating element 23a may be controlled by a suitable heat control device 23b interposed in an electrical circuit to heating means 23. The heating means 23 is carried by a bracket 23c, a portion of which is loosely penetrated by one of the legs of main body 11a of second forming unit 22 and which is held in the desired vertically adjusted position by a set screw 23d. The curvature of the upper portion of auxiliary body 11b of second forming unit 22, and the distance between the legs thereof, are such as to squeeze the upper portion of the tube being formed and cause the web side edges to be pressed firmly together while they are still sufficiently hot so that they are firmly bonded together.

Following formation of web W into the tube T, tube T passes through the nip of a pair of rolls 12a, 12b of slitting means 12, which rolls cooperate in flattening the two halves of tube T into superposed contacting relationship while also slitting the tube in its course therethrough in a pattern of spaced apart rows of spaced longitudinally extending incisions 25 (FIG. 7) with the rows extending substantially parallel to the axis of tube T; i.e., with the rows extending substantially parallel to the seam S at the fused together side edges of the web. Also, the incisions 25 in adjacent rows are disposed in staggered relationship so that the resulting slitted tube, or lengths thereof, may be stretched radially to receive therein an article, such as the article A in FIG. 8, which is of greater cross-sectional area than the initial internal cross-sectional area of the tube T and the tube then will recover into substantial conformance to the size and shape of the article A.

Accordingly, one of the cooperating rolls of the slitting means 12; e.g., the bottom roll 12a in this instance, is provided with a plurality of radially projecting, axially spaced and circularly spaced knives or cutting blades 12c extending around the periphery thereof. Of course, the circularly spaced blades 12c form annular rows of blades, and it is to be noted that the blades in adjacent annular rows are disposed in offset or staggered relationship so as to form the rows of incisions 25 in the tube T with the incisions in the adjacent rows disposed in the desired staggered relationship.

Slitting roll 12a is formed in a novel manner in accordance with this invention to obviate the need for utilizing a plurality of individual cutting blade rings or indivdual cutting blades on the slitting roll and thereby facilitating economical manufacture of the slitting roll and maintenance of sharp cutting edges on the blades thereof. According to the invention, blades 12c are successively arranged in a spiral manner around and lengthwise of slitting roll 12a. To this end, blades 12c are parts of a discontinuous sharp-edged spiral thread which may be cut as a continuous standard machine thread on a conventional lathe. Each annular thread portion is substantially of inverted V-shaped in cross-section and adjacent annular or convolute ridge portions of the thread define an annular substantially V-shaped groove therebetween as shown in FIG. 5. After the thread is formed it is formed into the circularly spaced substantially annular rows of blades 12c by forming a plurality of substantially equally spaced voids or recesses along the ridge of the spiral thread. Conveniently, such recesses may be formed by drilling radial holes 12d through the annular wall of roll 12a at the desired spaced intervals along the projecting spiral ridge of the threaded portion of roll 12a to define the slitting blades 12c between the holes 12d, as shown in FIGS. 4 and 5. Thus, whenever blades 12c become dull, they may be sharpened easily, simply by mounting roll 12a on a lathe and again machining or grinding the threaded portion thereof.

Roll 12b may be in the form of a smooth, hard-faced roll and serves as a pressure or anvil roll to press the flattened tube T against slitting blades 12c and thereby to cause the slitting blades 12c to penetrate and form incisions 25 through both halves of tube T. The length and spacing of the blades 12c of roll 12, and of the resultant incisions 25 being formed in tube T, may vary depending upon the cross-sectional area of the tube being formed, the desired stretchability of the tube, the desired tensile strength in the tube opposing the radial stretching of the tube and tending to return the same to its initial internal cross-sectional area or relaxed condition, and, to some extent, upon the nature of the articles to be positioned therein. With these factors in mind, the individual blades 12c may be in the range of about ¼ to 2 inches long and may be spaced apart both axially and annularly a distance in the range of about $\frac{1}{16}$ to ½ inch or more. As a non-limiting example, a typical polyethylene foam tube formed on an apparatus constructed in accordance with this invention was about 2 inches in internal diameter in relaxed condition, with a wall thickness of about ⅛ inch. The adjacent rows of incisions 25 in the tube wall were spaced about ⅛ inch apart, each incision was about ⅜ inch long, and the incisions in each row were spaced about $\frac{3}{16}$ inch apart.

The cutting or slitting blades 12c may cause at least some of the material in the lower half of the flattened tube T to flow into the incisions being formed simultaneously in the upper half of the flattened tube T, tending to cause the two halves of the flattened tube to adhere to one another. Thus, in order to break any mating relationship between the material in one of the halves and the incisions in the other half of tube T resulting from cutting the incisions 25 therethrough, a tube opening or spreading means is provided which may take the form of an oval or spherical spreading member 26 (FIG. 1) of lesser cross-sectional area than the initial internal cross-sectional area of tube T and positioned downstream from slitting means 12 and within tube T so as to spread opposing halves thereof apart from each other.

It is apparent that spreading member 26 is floatingly positioned within the tubular packaging material being formed. Thus, in order to restrain spreading member 26 against forward motion with tube T, a pair of press rolls 26a, 26b is journaled in frame 15 downstream of slitting means 12 for not only restraining spreading member 26 from forward motion with tube T, but also for compressing tube to again flatten the same so that opposing halves thereof are disposed in compact superposed contacting relationship to facilitate storing and handling of the thus formed tubular material.

As preferred, after the tube T is flattened between rolls 26a, 26b, it is formed into a spiral or convolute wound roll 13a by the take-up means 13.

Referring again to slitting means 12, in order that the relative positions of rolls 12a, 12b may be accurately adjusted, bottom roll 12a is journaled on a stationary platform 12e of frame 15, and each end portion of roll 12a is straddled by a pair of substantially vertically disposed threaded posts 12f with nuts n thereon and on which a transverse bar or bearing unit 12g is mounted for vertical adjustment (FIG. 3). Opposite ends of anvil roll 12b are suitably journaled in bearing units 12g. Platform 12e also serves as a support for the forward portion of bar 11b of tube forming means 11. Further, suitable standards 26c are provided on the rear portion of platform 12e and in which the press rolls 26a, 26b are journaled. In order to advance the stock through the apparatus, a motive means 12k, mounted on frame 15, is drivingly connected to slitting roll 12a by suitable transmission means 12m (FIG. 3).

The roll 13a of tubular material 15a may be wound around a spindle 13b driven by a suitable motive means or electric motor 13c through an intervening slip clutch 13d. Slip clutch 13d may be of any well known type which is adjustable to maintain the tubular material T under the desired tension as it is being wound onto spindle 13b. Motive means 13c may be mounted on a suitable standard 13e of frame 15.

It is thus seen that I have provided an improved apparatus for producing resilent, readily stretchable tubes and having means for curving a sheet or web of flexible foam material while bringing opposing longitudinal side edges of the web into substantially parallel, proximal or collinear relationship and maintaining them in such relationship while a seam S is formed therealong. As heretofore indicated, the preferred embodiment of the apparatus is devised to accommodate thermoplastic foam material. Therefore, the disclosed embodiment includes novel means cooperating with tube forming means 11 for heat-sealing the opposing side edges of the web together to form the seam S and resulting in formation of tube T. It also can be seen that novel means are provided for flattening and slitting the tube during continuous operation of the apparatus so as to provide a pattern of spaced apart rows of spaced incisions 25 through the tube wall with the rows extending subtsantially parallel to the axis of the tube and with the incisions in adjacent rows in staggered relationship so that the tube may be stretched radially, as shown in FIG. 8, to receive therein an article A of greater cross-sectional area than the initial internal cross-sectional area of the tube, and the tube then will recover into substantial conformance with the size and shape of the article A therein. The incisions 25 then take on an open lozenge-like configuration imparting a net-like appearance to the tube T surrounding the article A.

As heretofore described, the incisions 25 are formed in the flexible foam material following formation of tube T. However, it is to be understood that the incisions may be formed in web W, as shown in FIG. 6, before the tube is formed therefrom, without departing from the invention, simply by positioning slitting means 12 upstream of forming means 11 instead of in the position illustrated in FIGS. 1, 2 and 3. In such event, spreading member 26 may be omitted, although press rolls 26a, 26b would be mounted downstream of forming means 11 to flatten tube T to facilitate forming the wound roll 13a thereof.

Although the apparatus described herein is particularly useful in forming slitted tubes from flexible foam material, it is apparent that the apparatus is equally useful in forming slitted tubes of other flexible materials, such as thermoplastic sheets, without departing from the invention.

In the drawings and specification, there have been set forth preferred embodiments of the invention, and although specific terms are employed, they are used in a generic and descriptive sense only.

That which is claimed is:

1. Apparatus for producing a resilient, readily stretchable tube from an elongate web of flexible thermoplastic foam material for receiving and packaging articles in the tube, said apparatus comprising means for advancing the web along a path of travel, a forming unit including means defining an opening therethrough for passage of the advancing web therethrough, said opening being of such cross-sectional area with respect to the width of the web as to curve the web and bring opposing longitudinal side edges thereof into substantially collinear relationship, means downstream of said forming unit and cooperating therewith for heating and fusibly uniting the opposing side edges of the thus curved advancing web to form a tube therefrom, slitting means downstream of said heating and fusing means for flattening and slitting the thus formed tube in a pattern of spaced apart rows of spaced incisions with the rows extending substantially parallel to the axis of the tube and with the incisions in adjacent rows in staggered relationship, said slitting means comprising a pair of cooperating rolls forming a nip therebetween through which the tube is flattened and advanced, at least one of the said rolls having a plurality of axially spaced substantially annular rows of spaced cutting blades projecting radially therefrom with the blades in adjacent annular rows being staggered to form said incisions through the flattened tube, and spreading means downstream of said rolls and engaging the interior of said advancing tube for spreading opposing halves thereof apart from each other to insure that they may be readily separated in the event that said cutting blades displace any of the material in one of the halves into the incisions being formed in the other of the halves to such extent as to tend to hold the two halves of the tube together.

2. Apparatus according to Claim 1, further comprising means downstream of said spreading means for again flattening said tube to bring the two halves thereof into contacting relationship to facilitate forming a wound roll of the thus formed tube, and take-up means downstream of said flattening means for taking up and forming said tube into a roll after the incisions have been formed therein by said slitting means.

3. Apparatus as defined in Claim 1, wherein said advancing means comprises means for rotating said pair of slitting rolls to pull the tube therethrough and advance the web through the opening in said forming unit and past the heating and uniting means.

4. The apparatus as defined in Claim 1 further including an additional forming unit positioned immediately downstream of said heating and uniting means, said additional forming unit including means for forcing together the heated edges of the advancing web to form a heat sealed seam therealong.

5. The apparatus as defined in Claim 4 wherein at least said first named forming unit comprises a pair of substantially U-shaped forming bodies each having a pair of spaced legs and a bridging bite portion extending between and interconnecting the respective pair of legs, and wherein the bridging bite portions and the legs of said pair of forming bodies collectively define said opening therebetween.

6. The apparatus as defined in Claim 5 wherein at least said first named forming unit further comprises means for adjustably interconnecting said pair of forming bodies to permit relative lateral adjustment such that the size of said opening defined therebetween may be varied.

7. The apparatus as defined in Claim 1 wherein said substantially annular rows of spaced cutting blades on said one roll are arranged in a spiral configuration around and throughout at least a substantial portion of the length of said roll.

References Cited
UNITED STATES PATENTS

| 2,631,509 | 3/1953 | Whytlaw | 156—203 |
| 3,650,868 | 3/1972 | Murota | 156—203 |
| 3,470,782 | 10/1969 | Acker | 83—649 |
| 3,575,027 | 4/1971 | Eisler | 156—513 |

DOUGLAS J. DRUMMOND, Primary Examiner

U.S. Cl. X.R.

83—54, 332, 672; 156—513; 225—97